Jan. 9, 1923.
J. LEDWINKA.
1,441,436.
JIG FOR USE IN ASSEMBLING AND ELECTRICALLY WELDING TOGETHER THE PARTS OF AUTOMOBILE BODIES AND OTHER STRUCTURES.
FILED MAR. 15, 1921.
8 SHEETS—SHEET 2.
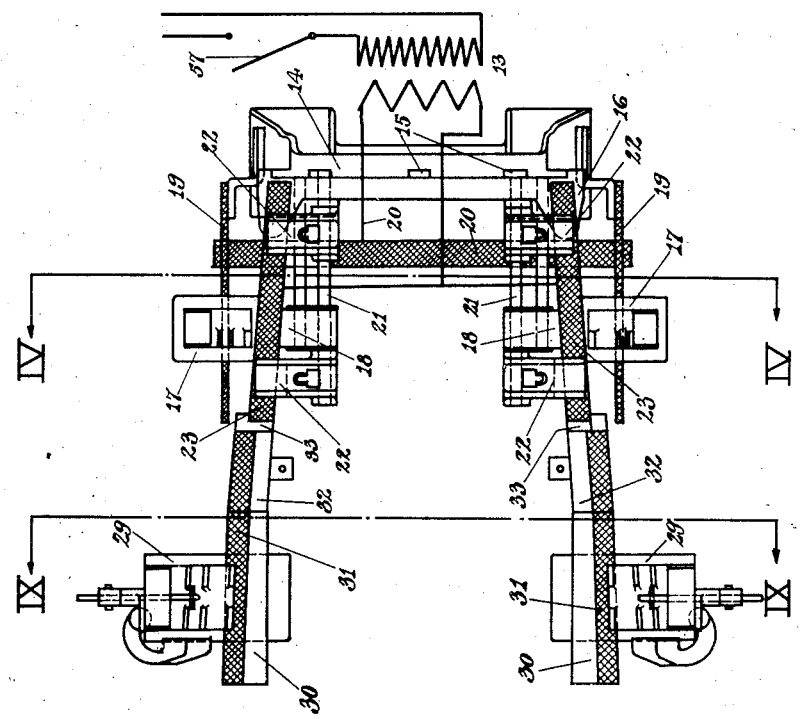
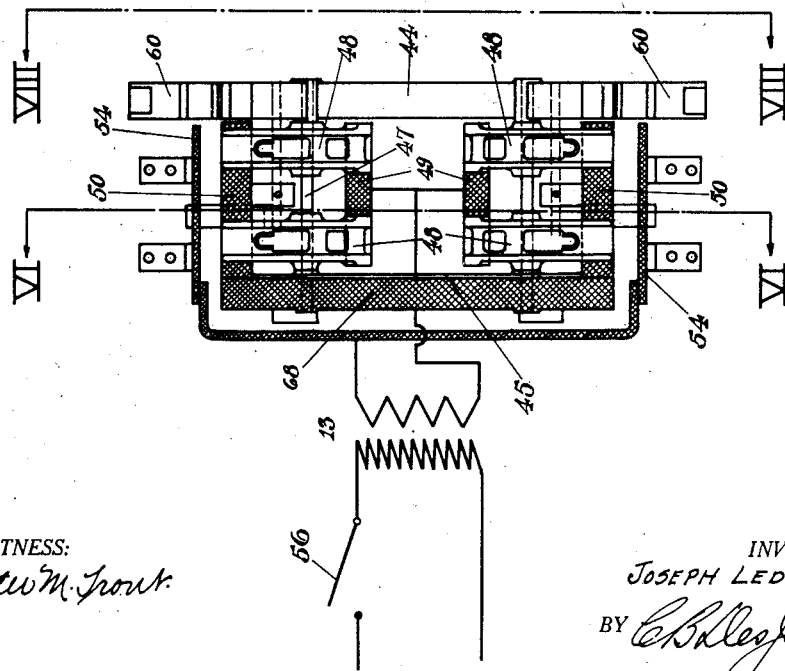
WITNESS:
Walter M. Trout.
INVENTOR.
JOSEPH LEDWINKA
BY C. B. Desjardins
ATTORNEY.

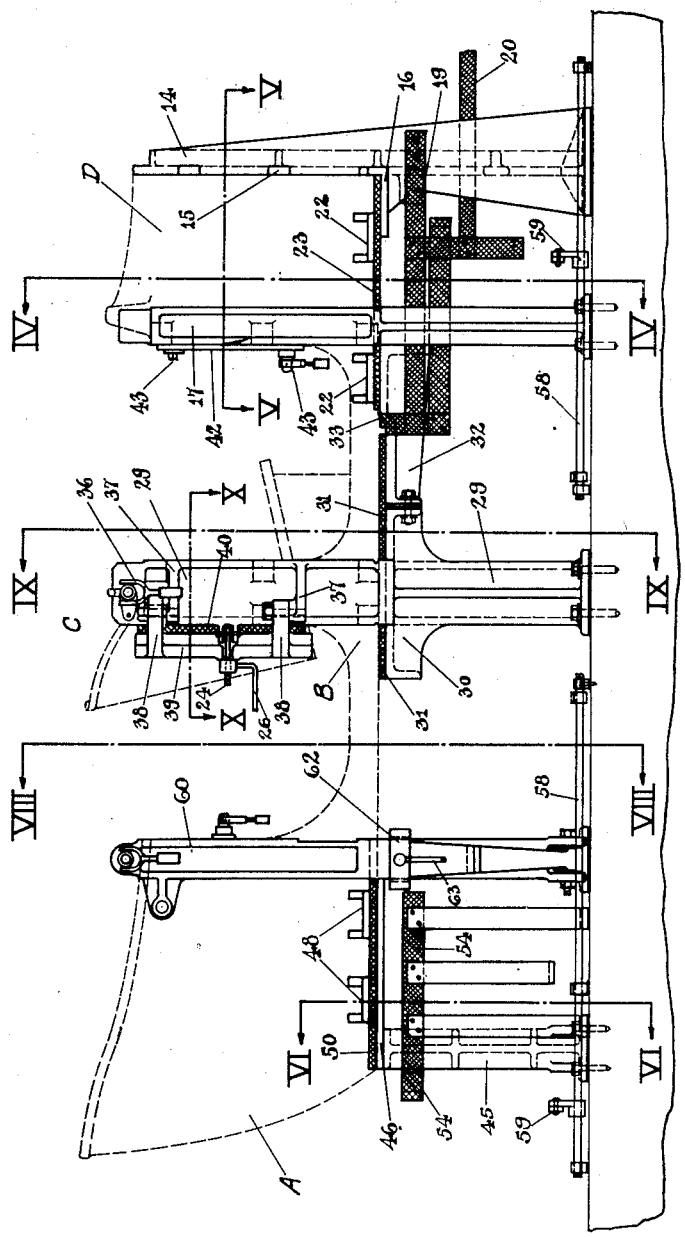

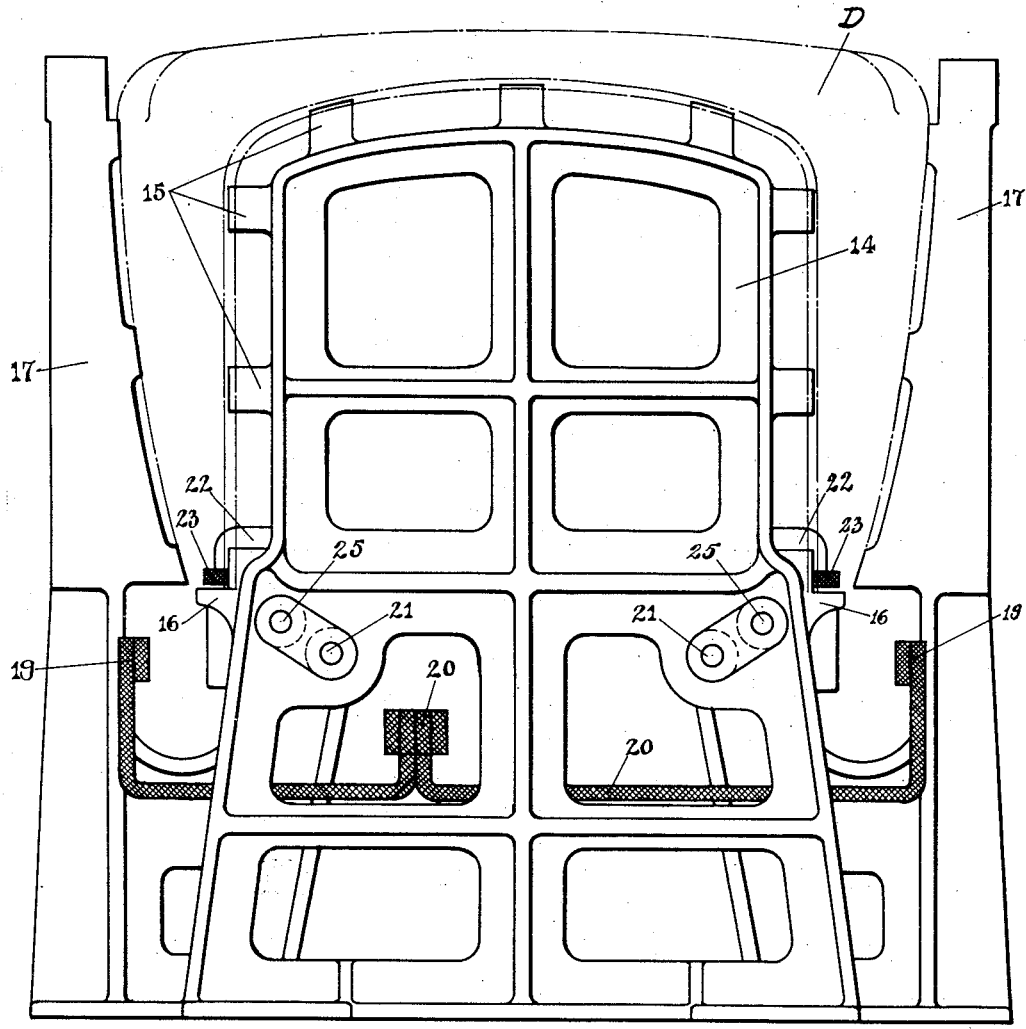
Fig III

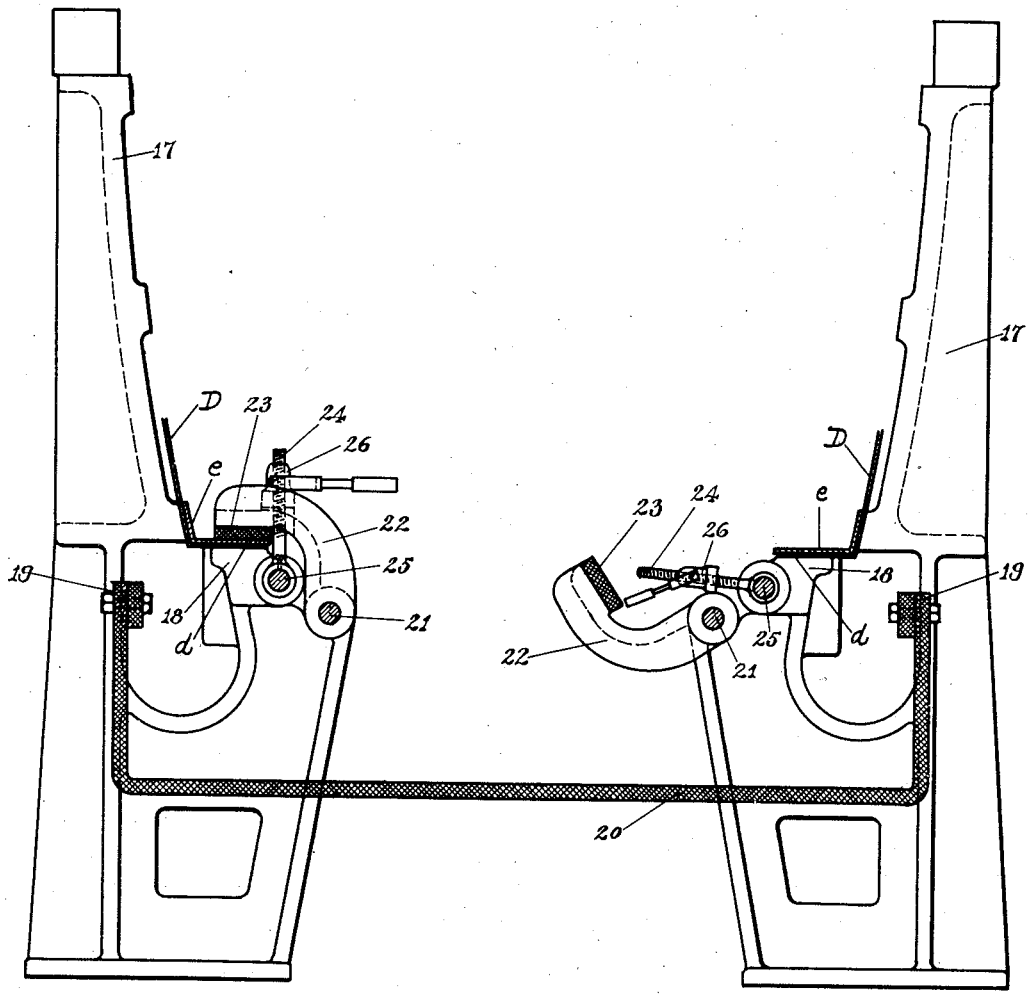
FIG IV

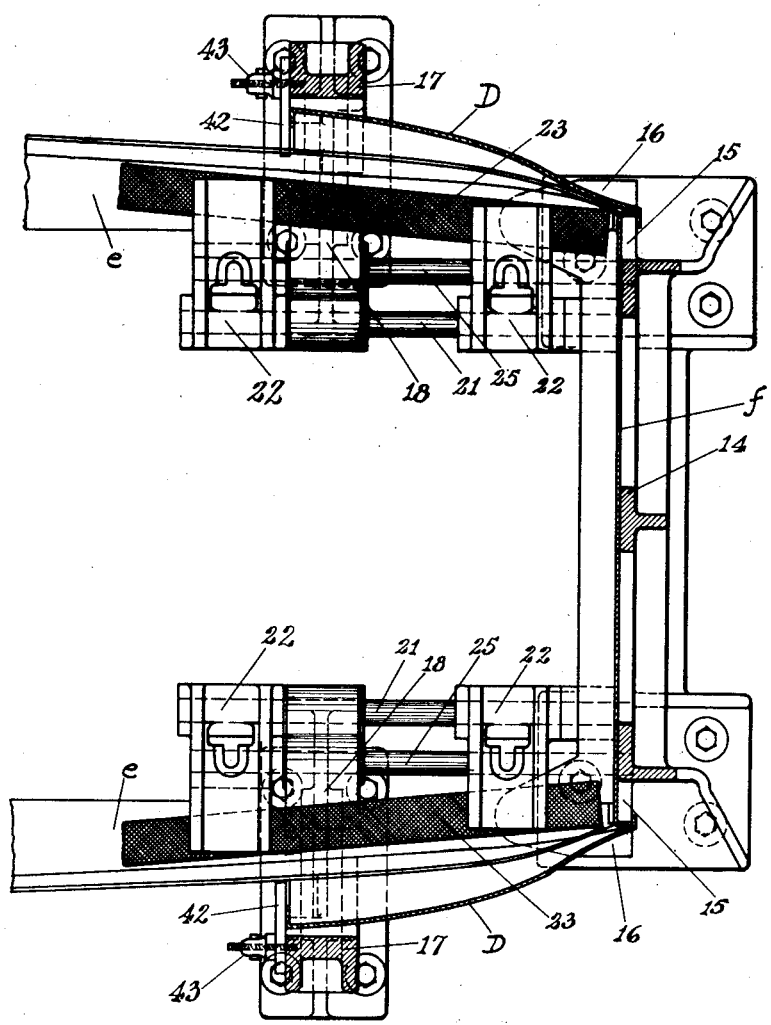
Fig V

Jan. 9, 1923. 1,441,436.
J. LEDWINKA.
JIG FOR USE IN ASSEMBLING AND ELECTRICALLY WELDING TOGETHER THE PARTS OF AUTOMOBILE BODIES AND OTHER STRUCTURES.
FILED MAR. 15, 1921. 8 SHEETS—SHEET 6.
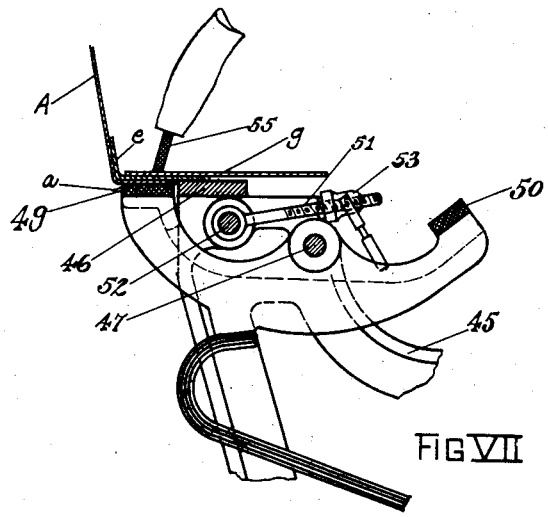
FIG VII
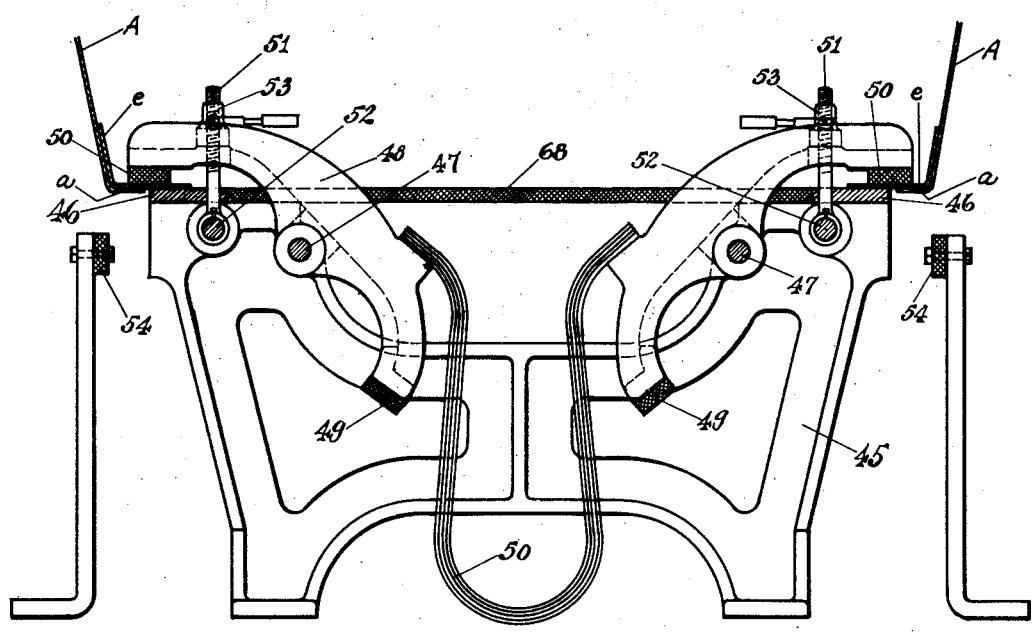
FIG VI
WITNESS:
Walter M. Trout
INVENTOR.
JOSEPH LEDWINKA
BY C. B. Desjardins
ATTORNEY.

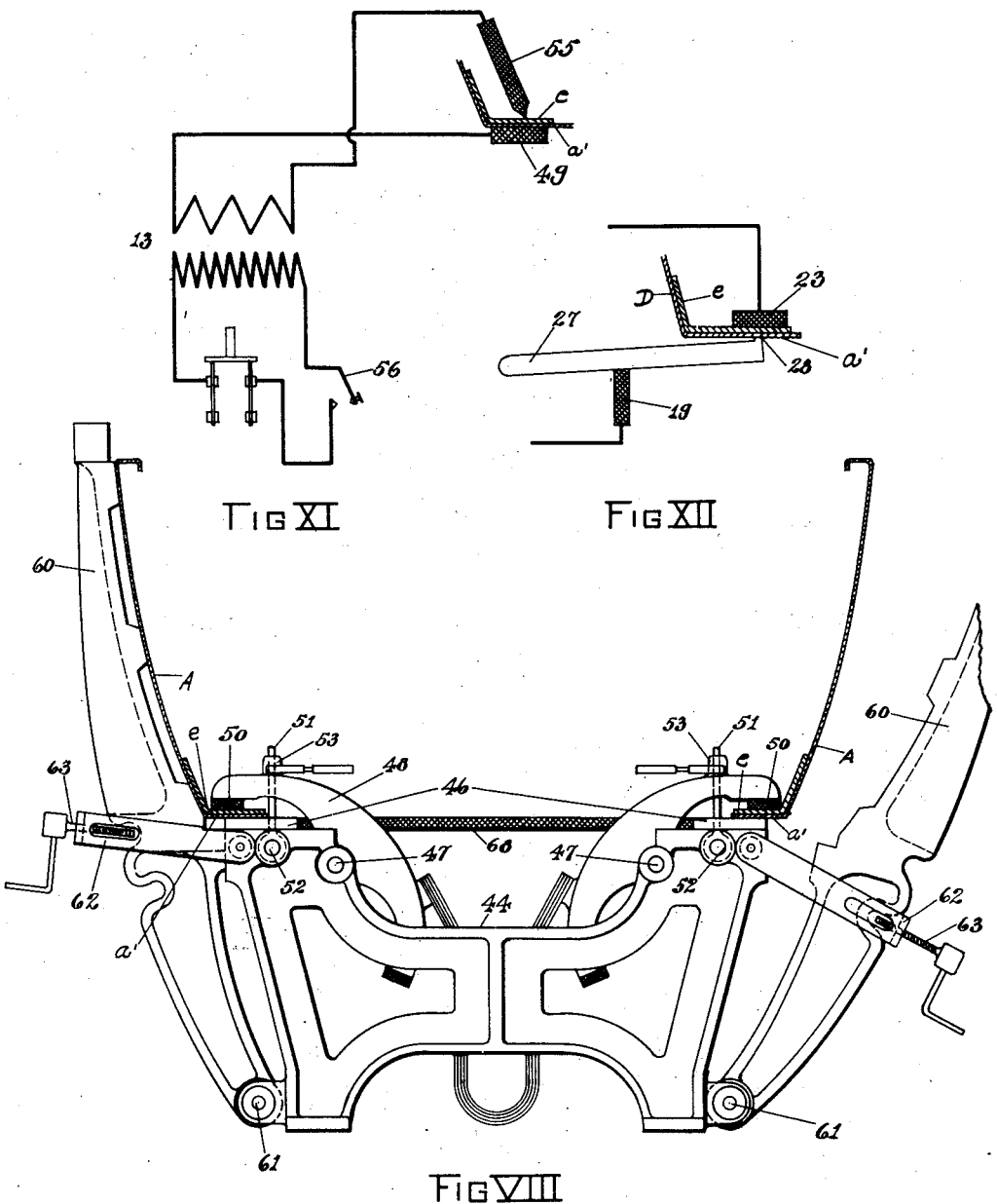

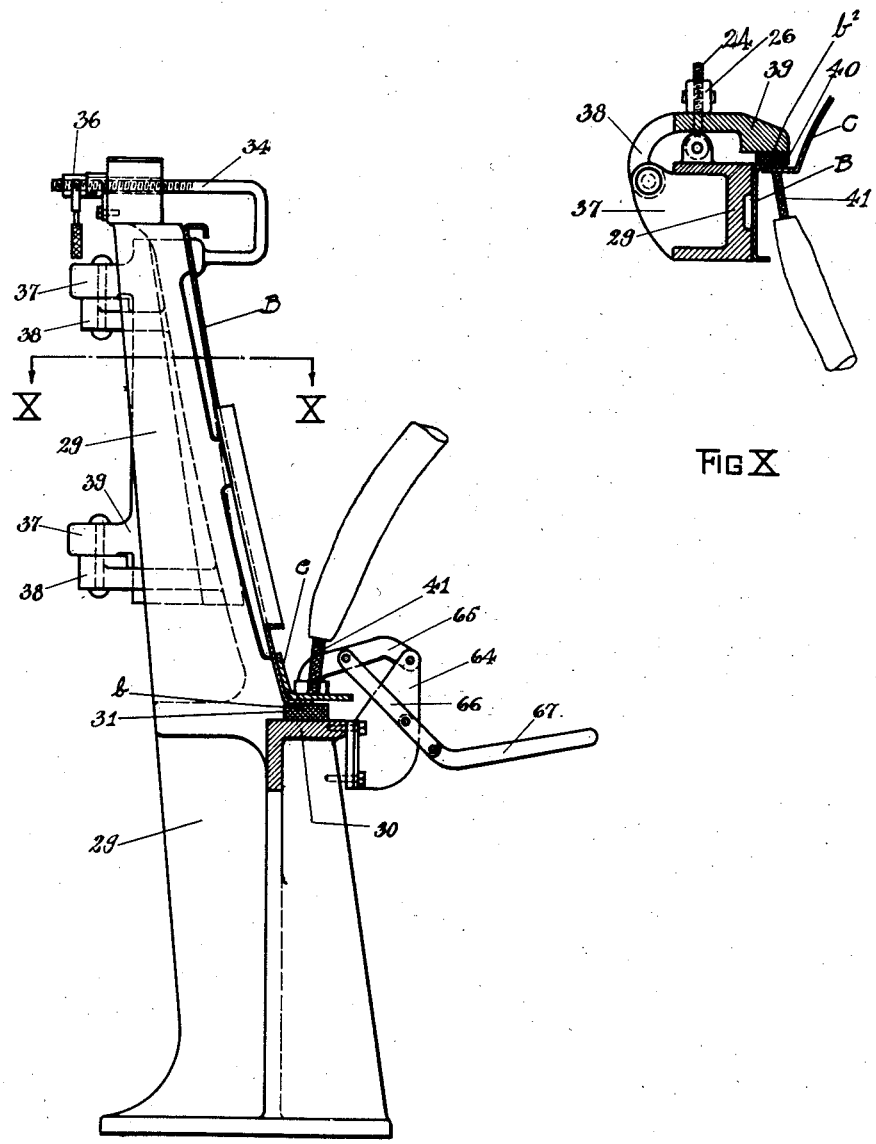

Patented Jan. 9, 1923.

1,441,436

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

JIG FOR USE IN ASSEMBLING AND ELECTRICALLY WELDING TOGETHER THE PARTS OF AUTOMOBILE BODIES AND OTHER STRUCTURES.

Application filed March 15, 1921. Serial No. 452,503.

*To all whom it may concern:*

Be it known that I, JOSEPH LEDWINKA, residing at Philadelphia, Pennsylvania, have invented certain new and useful Improvements in Jigs for Use in Assembling and Electrically Welding Together the Parts of Automobile Bodies and Other Structures, of which I declare the following to be a full, clear, and exact description.

This invention relates to jigs for use in assembling and electrically welding together the parts of automobile bodies and other structures.

This application is a division in part of my pending application for jigs for use in electrically welding the parts of automobile bodies and other structures, Serial No. 307,920, filed July 1st, 1919.

One of the objects of my invention is to provide a jig of this nature which is simple in structure and efficient in operation, and by means of which the assembling and welding together of the parts of an automobile body, or other structure, may be greatly simplified, cheapened and expedited.

Another object of my invention is to provide a jig or assembling machine of the nature referred to, in which the parts to be welded together may be quickly and easily assembled in proper position and relation and welded together at the various points required.

Another object of my invention is to provide a jig or assembling machine of this nature, in which many of the welds required can be made from the outside of the body.

Another object of my invention is to provide a jig or assembling machine of this nature, so constructed as to permit ready access to the interior of the assembling apparatus and to increase the facility with which a number of workmen may be simultaneously employed upon the same jig.

Further objects, and objects relating to economy of material and details of construction and operation, will definitely appear from the detailed description to follow. I accomplish the objects of my invention by the devices and means described in the following specifications. My invention is clearly defined and pointed out in the appended claims. A structure constituting a preferred embodiment of my invention is illustrated in the accompanying drawings, forming a part of this specification, in which:—

Fig. I is a view in side elevation of a jig structure embodying my invention, an automobile body being shown by dotted lines positioned in said jig.

Fig. II is a top plan view of the jig, the electrical connections being shown diagramatically.

Fig. III is a view of the jig in front elevation.

Fig. IV is a detail, sectional view through the front part of the jig, taken on the line IV—IV of Fig. I and II.

Fig. V is a detail, sectional view taken on the line V—V of Figs. I, III and IV.

Fig. VI is a sectional view taken on the line VI—VI of Figs I and II.

Fig. VII is a fragmentary view, corresponding to a part of Fig. VI, but showing the swinging member in another position.

Fig. VIII is a view in elevation of the rear part of the jig, taken on the line VIII—VIII of Figs. I and II.

Fig. IX is a detail, sectional view, taken on the line IX—IX of Figs. I and II.

Fig. X is a detail sectional view, taken on the line X—X of Figs. I and IX.

Fig. XI is a diagrammatic view illustrating an electric welding circuit employed in effecting the welding operation.

Fig. XII is a similar view showing another method of effecting the welding operation.

In the drawings, similar reference numerals refer to similar parts throughout the several views, and the sectional views are taken looking in the direction of the arrows at the ends of the section lines.

In the manufacture of sheet metal automobile bodies, and, indeed, in many other structures, the time and labor required to assemble and weld together the various parts composing the body or structure constitute important elements in the cost of manufacture, and the efficiency with which the parts of the body or structure are secured together constitutes an important feature in determining and establishing the value of the body when manufactured.

It is among the special purposes of my present invention to provide an apparatus in which the various sheet metal parts required to make up a complete body, or other structure, may be easily and quickly assembled together in the required positions relative to each other, and, while retained or held in place in such assembled position, electrically welded. In this manner, I not only unite the parts of the body in a very strong and efficient manner, but I also reduce considerably the time and labor required to complete the body, or other structure. The various parts of an automobile body, for example, are made up of a number of sheet metal stampings. In ordinary modern practice, these stampings comprise the tonneau, or rear seat, stamping, A, the side panels, B, the front seat panel, C, and the shroud panel, D. In addition to these particular body shell stampings, there are other stampings making up the parts of the body frame, such, among others, as the body sills, the seat frames, the seat supports, the door posts, the cross members, the seat pans and floor boards and the like. In producing a complete automobile body, it is necessary to secure these various parts and stampings together and it has been found that the best results are obtained by electrically welding these various parts together. In mass production, the cost of manufacture of such bodies is materially affected by the speed with which the various parts forming the complete body may be assembled together and welded while held in such assembled position.

It is, further, among the special purposes of my present invention, to provide a jig or assembling machine in which the various parts composing the complete body may be quickly assembled and held in assembled relation and may be speedily welded together at the required points, even where such points may be difficult of access.

It will be evident that the time required for such assembling and welding operations will be greatly reduced, if a larger number of men are able to work efficiently upon such operations at the same time. It is therefore also among the purposes of my present invention to provide a welding jig which enables subdivision of the labor of assembling and welding the body and permits several men to work on it simultaneously. Having this purpose in mind, I have, among other things, provided a welding jig in which many of the welds required may be made from the outside of the jig, while others are made from inside the body or jig, so that more space is left for those men whose duties require them to work inside the body, or welding jig.

In the accompanying drawing, I have have shown one form of structure of a welding jig constituting an embodiment of my invention which has proven satisfactory in actual practice and, by means of which, I am able to accomplish the objects and purposes which I have mentioned above.

In general, this welding jig is divided into three parts or sections. The front section includes the parts which receive and retain in assembled position the parts constituting the shoud or cowl of the automobile body, together with the welding means cooperating therewith. The central part of the jig includes the means for supporting and welding together the front seat portion of the body, while the rear section of the jig includes the parts for receiving the tonneau or rear seat panel of the automobile body and for making the necessary welds in such part.

In this embodiment of my invention, I derive electric welding current from suitable transformers. The leads from the secondaries of such transformers are incorporated in the jig structure at the necessary points to accomplish the welding operations throughout the assembled parts composing the entire body to be welded. In the particular embodiment which I have illustrated here, I have provided a transformer associated with each end of the jig. I am not to be restricted or limited to this construction, however, although it is very desirable as it permits free access to the central part of the jig by eliminating the greater part of the electrical connections at this point.

Automobile bodies of the type for which this particular machine is designed, are made up, as I have already indicated, of various body shell stampings and a body framework which may include body sills and various door posts, seat supports and other cross members. At the front end of the machine, means are provided for holding the shroud panel in assembled relation with the forward ends of longitudinally extending body sills, with flanges on the lower side portions of the shroud panel engaging against the body sills, and means are also provided for welding such flanges to the body sills.

In general, the front end of the jig includes a framework which is so constructed and proportioned as to receive the cowl, or shroud, and associated parts, including the front ends of body sills, and to support such parts in the proper assembled relation with respect to each other. Means are provided for bringing a conductor bar connected with one side or terminal of the transformer secondary into contact with the parts to be welded and closing the circuit from such conductor bar and through the parts to be welded together. In this embodiment of my invention, among the welds to be made at the front part of the jig are those which secure the front ends of the longitudinal body sills to the lower inturned flanges of the cowl panel. I provide cooperating conductor bars respectively connected to opposite terminals of the transformer secondary circuit, one of which may be brought into contact with one surface at the parts to be welded and one of which is positioned alongside of, but out of contact with the parts to be welded, and which constitutes a conductor bar as well as a fulcrum for a conducting contact or lever which closes the circuit through the parts to be welded together. This lever is fulcrumed on the outside or fulcrum conductor bar or electrode, and has a point on one end which may be brought into contact with the lower surface of the parts to be welded. It will be seen that the welds to be made by means of this connector lever are made from the outside of the jig.

In the embodiment of my invention which I have illustrated in detail in this application, there is provided a vertical transversely extending end frame, 14, which has a series of lugs, 15, projecting from the upper portion thereof and so disposed as to form gauge stops which receive and position the front edge of the cowl panel, D, as shown in Figs. I and V. In the particular type of automobile body for which the illustrated form of jig construction shown is designed, the forward edge portions of the cowl or shroud panel are connected and strengthened by the shroud pan, f, as shown in Fig. V, such shroud pan having a projecting flange at its edges, which is secured to the front portions of the cowl panel. This flange rests on the stops, 15, as shown in Fig. V, with the shroud pan contacting with the rear face of the end frame, 14. The transversely extending end frame, 14, is provided at each side thereof with portions, 16, which are so located and formed as to provide ledges or seats, on which the forward lower corners of the cowl may be supported.

Adjacent the end frame, 14, there are provided vertical standards or side frame members, 17, there being one of these side frame members at each side of the machine, so located or positioned that they extend upwardly, in line with the front door posts of the body, that is, in line with the rear edges of the cowl. The upper portions of said vertical standards, 17, have their inner faces curved to conform to the curvature of the body and are adapted to support the body at the front door posts. The standards, 17, are each of them provided with an inwardly extending portion, 18, which forms a seat on which the lower portion of the cowl, adjacent the front door, is supported. In the particular type of body selected for illustration of my invention and as shown in Fig. IV, the lower edge portions of the cowl panel, D, are flanged inwardly, as shown at d, and the forward ends of the body sills, e, rest on these flanges, d. Conductor bars, 19, may be supported by the end frame, 14, and the vertical standards, 17, and extend lengthwise of the frame but, in practice, are located at a sufficient distance outside and below the cowl so that they will not interfere with the proper assembling of the panels, while, at the same time, permitting a conducting member forming a connector lever to span the space between the outside conductor bar, 19, and the part to be welded so as to close a welding circuit through such parts from the outside to the inner side cooperating conductor bar in the manner I will now describe. The conductor bars, 19, on opposite sides of the jig, are connected by the leads, 20, to one side of the secondary of the transformer, 13. Rods, 21, may be mounted in the end frame member, 14, and the side frame members, 17, as shown in Figs. IV and V, and these rods, one at each side of the jig, form fulcrums for the rocking members, 22. In the particular arrangement shown a pair of these rocking members are mounted on each of the rods, 21, see Fig. V, and together carry the longitudinally extending conductor bar, 23, so arranged on the rocking members that, when the latter are swung to the position shown at the left in Fig. IV, the conductor bar, 23, contacts with the upper surface of the assembled parts to be welded, in the particular one shown, the upper surface of that portion of the body sill, e, under which the lower flange, d, of the cowl panel engages. Any suitable fastening means may be provided for engaging and clamping these rocking members, 22, in position, so as to hold the conductor bars, 23, in engagement with the parts to be welded. These clamping means may very well take the form shown in Fig. IV, in which the studs, 24, are mounted to rock on rods, 25, carried by the frame members, 14 and 17, in the same manner as the rods, 21. Clamp nuts, 26, mounted on these studs, 24, are adapted to engage the rocking members, 22, so as to clamp them in position. This forms a very convenient and quickly releasable means for clamping the members, 22, in position.

At the right hand side of Fig. IV, these members are shown released and thrown back so as to remove the conductor bar, 23, and permit the removal of the body. In this embodiment of my invention the welds are effected in the manner illustrated diagrammatically in Fig. XII. The connector lever, 27, is fulcrumed at any desired place along the fulcrum electrode formed by the conductor bar, 19, and the lever may have a point, 28, which engages the lower surface of the parts to be welded. When pressure is brought to bear downwardly on the outer end of the lever, 27, the point, 28, is forced upwardly against the under surface of the parts to be welded and closes the circuit between the fulcrum electrode, 19, and the conductor bar, 23, which is connected to the opposite side of the transformer secondary. The connector lever, 27, may be shifted to any desired position along the fulcrum electrode, 19, so as to make a weld at as many places as desired. When not in use, the lever, 27, may be entirely removed from the jig. A plate, 42, may be slidably mounted on the side of each standard, 17, engaging the rear edge of the cowl panel, as shown in Fig. V. The clamps, 43, may be provided for releasably engaging this plate.

Rearwardly of the side standards, 17, there are positioned the vertically extending side standards, 29, which are located in line with the portions of the body shell between the front and rear door openings. These vertical standards are best shown in Figs. I and IX. The standards, 29, may each be provided with a portion, 30, forming a horizontal seat extending beneath the lower side portions of the body, and on these seats are mounted conductor bars, 31, which are disposed beneath the inturned flanges $b$, of the side panel, B, the body sills, $e$, in the particular type of body shown, being disposed above these flanges in the same relation as shown in Fig. IV. The standards, 17 and 29, are connected by the members, 32, which may have portions, 33, adjacent the standards, 17, and forming a continuation of the seats or supporting surfaces formed by the upper surfaces of the conductor bars, 31. At the upper end of the standards, 29, there may be provided clamps, 34, which extend over the upper edges of the side panel, as shown in Fig. IX. A quickly releasable clamping device, 36, may be provided for fastening this clamp in position.

A pair of projecting arms, 37, extend laterally from each side standard, 29, and on these arms are pivotally mounted the hinge arms, 38, of the swinging gate, 39, which carries a conductor bar, 40, adapted to contact with the outer surface of the, in this instance, vertically disposed flange, $b^2$, extending laterally from the side panel, B, as shown in Fig. X. The swinging gate, 39, may be clamped in position by the device including the pivoted stud, 24, and nut, 26. In the particular body construction shown here, the front seat panel, C, has a vertically disposed flange at each side thereof, which engages the corresponding flange, $b^2$, of the side panel. The side panels and the seat panels may be welded together at these points by the means shown in Fig. X, including the movable electrode, 41, which is connected to one side of the transformer secondary and co-operates with the conductor bar, 40, mounted on the swinging gate, 39, and connected to the opposite side of the transformer secondary. When the gate, 39, with its conductor bar, 40, is clamped against the panel flange, $b^2$, and the movable electrode, 41, is brought against the flange of the seat panel, C, and the pressure is applied thereto, a welding circuit is closed through the parts to be welded at such point, and by shifting the electrode, 41, a series of welds may be made at the desired points, thus joining the seat panel to the side panel. In a similar manner, the body sills, $e$, and the flanges, $b$, of the side panels may be welded together by bringing the movable electrode, 41, into contact at the desired points with the upper surface of the one part and applying pressure thereto so as to close the circuit between such movable electrode, 41, and the stationary electrode, 31, on which the other part to be welded rests.

The rear portion of the machine is adapted to receive and support the tonneau panel in proper position with reference to the rear ends of the longitudinal body sills, as well as the rear cross sill member and, also, to support the tonneau floor-board and other members in correct relation with respect to these parts. I provide fulcrum electrodes, one disposed outside and below each side of the tonneau, and also a movable electrode connected to the same side of the transformer secondary as the fulcrum electrodes. A pair of swinging, reversible rocking members is provided and each of these rocking members carries conductor bars on its opposite ends, respectively adapted to co-operate with said fulcrum electrode and said movable electrode. The rocking members are so positioned that each of them may be swung to a position bringing one of the conductor bars, as 50, into engagement with the upper surface of the parts to be welded, whereby a weld can be made by the use of the connector lever, 27, shown in Fig. XII, in co-operation with the fulcrum electrode in the same manner as above explained, operating against the lower surface of the parts to be welded. These rocking members may be reversed so as to bring the conductor bars, 49, on the opposite ends of the members into engagement with the lower surface of the parts to be welded and the movable electrode, 55, in this case is contacted with the upper surface of said parts and co-operates with these conductor bars, 49, to make the welds. I may also provide the tonneau portion of the jig with vertically extending supports which are positioned in line with the forward edges of the tonneau and which may very well be pivotally mounted so that they may be swung away from the body to facilitate its removal after the completion of the welding operations.

The rear part of the jig structure comprises the cross frames, 44 and 45, which may be similar in construction, one disposed toward the forward portion of the tonneau and the other toward the rear of the tonneau. Supporting members, or bars, 46, may be mounted on their ends at the upper corners of the cross frames, 44 and 45, respectively. Rods, 47, may be mounted between the cross frames, 44 and 45, and on these rods are journaled the swinging members, 48, on opposite ends of which are mounted the conductor bars, 49 and 50. These conductor bars, 49 and 50, are connected together and to one side of the transformer secondary through the flexible conductor strip, 50, or otherwise. The swinging members, 48, may be clamped in position as shown in Fig. VI, with the conductor bars, 50, engaging the upper surfaces of the parts to be welded, in this case the body sills, e, by means of the studs, 51, journaled on the rods, 52, carried by the cross frames, 44 and 45, and the clamp nuts, 53, mounted on the studs, 51, and engaging the swinging members, 48. Of course, other suitable clamping means may be used. A fulcrum electrode, 54, is positioned slightly below and outside each side of the tonneau panel, as shown in Figs. I and VI. These fulcrum electrodes are connected to the opposite side of the transformer secondary, from that to which the conductor bars, 49 and 50, are connected. The tonneau panel, A, is provided with inturned flanges, a, as shown in Fig. VI, to be welded to the body sills. The rear ends of the body sills may be supported by the bars, 46, and the flanges, a, may be welded to the body sills, e, by means of the connector lever, 27, such as shown in Fig. XII, which cooperates with the fulcrum electrodes, 54, and the conductor bars, 50, to close a welding circuit between them through the parts to be welded together, that is, the flange, a, and the sill, e. The conductor bars, 50, may be held in position to effect these welds by the clamping devices, 51. After flange, a, has been welded to the sill, e, a floor-board, g, is put in place, as shown in Fig. VII, after the swinging members, 48, have been reversed to the position shown in Fig. VII, with the conductor bars, 49, engaging the lower surfaces of flanges, 2, and the edges of the floorboard, g, in this instance, engaging the sills, e, above the flanges, a. The floor-board and the swinging members, 48, may be held in the desired position and relation as shown in Fig. VII, in any desired manner, and the parts are welded together by applying the movable electrode, 55, as shown in Fig. VII. This movable electrode, 55, is connected to the opposite side of the transformer secondary from that to which the conductor bars, 49 and 50, are connected. This welding circuit is illustrated diagrammatically in Fig. XI. At the rear portion of the jig, I may also provide a transversely extending conductor bar, 68, on which the rear, inturned tonneau flange and its associated transverse body sill member may be supported and be welded together by the application of the movable electrode, 55, in the manner which I have previously described.

Switches, 55 and 57, may be provided for controlling the welding circuit, and these switches may be controlled by the rock shafts, 58, actuated by the foot levers, 59, as shown in Fig. I. The vertically extending standards, 60, may be positioned in line with the front edges of the tonneau and pivotally connected at 61, to the lower corners of the cross frame, 44. These standards may be very conveniently connected to the cross frame, 44, by the straps, 62, and the clamping devices, 63, as shown in Fig. VIII. At the right hand side of Fig. VIII, the standard, 60, is shown in its released position to facilitate the removal of the body at the completion of the welding operation. On the standards, 29, I find it convenient to mount the brackets, 64, on which are mounted the swinging arms, 65, controlled by the links, 66, and the toggle levers, 67, to clamp the parts together while they are being assembled.

The front portion of this welding jig comprises a framework to support and retain the front ends of the body sills and the cowl panel or unit in proper relation to each other. In the particular construction which I have illustrated, but to which, of course, my invention is not to be limited or restricted, the body sills are of angle cross section and the sides of the cowl panel have lateral flanges at their lower edges extending under and engaging the lower surfaces of the front ends of the body sills. It is to be understood that other types of body structures may be assembled and welded with equal facility. This portion of the jig is provided with devices for welding the engaging portions of the sills and cowl panel together. The devices for this purpose, which I have illustrated, include conductor bars, which may be removably clamped in engagement with the upper surfaces of the parts to be welded, and the welding accomplished by a shiftable electrode member in cooperation with fulcrum electrode conductors positioned alongside of the cowl panel. The conductor bars and the fulcrum electrodes are connected to opposite sides of the transformer secondary and the welding circuit is closed, through the engaging flanges of the body parts, by fulcruming a connector lever on the fulcrum electrode and bearing down on it so that its inner end is pressed upwardly on the flange of the body sill above which the conductor bar is clamped or held in place. The connector lever may be moved about so as to make a number of different welds between these parts and may be removed from the machine when not in use.

The central portion of the jig comprises a framework to support and retain the central parts of the body sills, the side panels and the front seat panel in position with respect to each other. In the particular type of body construction illustrated, to which, however, my invention is not to be limited, the side panels are flanged inwardly under the body sills and, in order to weld these parts together, I have provided conductor bars on which the flanges of the side panels turned under the body sills rest, and a movable electrode which may be brought into engagement with the body sills at any desired point above the conductor bars. These conductor bars and the movable electrode are connected to opposite sides of the transformer secondary so that, when the movable electrode is pressed down on the body sill flange, the welding circuit is completed through these abutting flanges. I provide a similar arrangement for welding the vertical edges of the front seat panel to vertical flanges on the side panels, in which case the conductor bar is carried by a swinging gate and clamped against one of the abutting parts and the movable electrode is pressed against the other of the abutting parts.

The rear part of the welding jig comprises a framework for supporting the body sill members at the rear of the body, and the tonneau panel or unit, and retaining these parts in assembled relation with reference to each other. I have found it very efficient to employ pivotally mounted standards supporting the front parts of the tonneau which may be released and swung laterally when the welded body is to be removed from the jig. Of course, this feature of my invention may be omitted without departing from the main features of my invention. In the rear portion of the welding jig, I provide means for welding together the rear ends of the body sills and inturned flanges of the tonneau panel and for welding the tonneau floor board to the body sills. I have accomplished this by mounting, in the frame, members which may be moved from one position to another so that, in one position, conductor bars carried by the members are positioned against the lower surfaces of the parts to be welded and, in another position, conductor bars are positioned against the upper surfaces of said parts. In the latter position the engaging flanges may be welded together by means of a connector lever co-operating with fulcrum electrodes as described with reference to the front part of the jig. When the conductor bars are positioned against the lower surfaces of the parts to be welded, the flanges, sills and floor-board may be welded together by applying a movable electrode to the upper surface of said parts above the conductor bars.

In many cases, it is desirable to connect the conductor bars directly with the secondary of the transformer but this is not absolutely necessary and the conductor bars may be connected therewith through the metal framework. It is desirable, however, to make the conductor bars of copper, or some substance having similar electrical properties, so as to avoid burning the parts when making the welds.

From the foregoing description, it will be seen that I provide a very simple and efficient welding jig in which the stampings, panels and other metal parts which go to make up an automobile body, may be quickly assembled and welded together. This jig structure is of such a nature that several workmen may work on it at the same time, thus rendering the welding operation very speedy. It will be noticed that a large number of the welds may be made from the outside of the jig and that the jig is so arranged and constructed as to facilitate access to it, even during the welding operation.

I am aware that the particular embodiment of my invention, which I have described above, may be varied considerably without departing from the spirit of my invention, and, therefore, I desire to claim my invention broadly, as well as specifically, as indicated by the appended claims.

Having thus described my invention, what I claim as new and desire to secure by Letters Patent is:—

1. In an apparatus of the class described, the combination of means for receiving and supporting the members to be welded together in assembled relation, a pivotally mounted swinging member, a pair of electrodes carried thereby, one on each side of the pivot of said member, whereby said member may be swung to cause either of said electrodes to contact with the members to be welded together, a fulcrum electrode disposed adjacent said swinging member but spaced therefrom, means for completing an electric circuit between said fulcrum electrode and one of said pair of electrodes, in one position of the swinging member, and a movable electrode adapted to complete an electric circuit with the other of said pair of electrodes, in another position of the swinging member.

2. In an apparatus of the class described, the combination of means for receiving and supporting the members to be welded together in assembled relation, a stationary fulcrum electrode and a movable electrode, both connected to one side of a suitable source of welding current, a pair of electrodes movably mounted and connected to the other side of said source of current, one or the other of said pair of electrodes adapted to be moved into contact with said members, and a bridging member adapted to complete a circuit between said fulcrum electrode and one member of said pair of electrodes, when the latter is in contact with said members, said movable electrode co-operating with the other member of said pair of electrodes to close a circuit therebetween when the latter is in contact with said members.

3. In an apparatus of the class described, the combination of means for receiving and supporting the parts to be welded in assembled relation, a pair of electrodes both connected to one side of a source of welding current, one member of said pair of electrodes being adapted to be positioned on one side of the parts to be welded and the other on the other side thereof, a stationary electrode and a movable electrode connected to the other side of said source of current, said stationary electrode being disposed adjacent to but spaced apart from the pair of electrodes, and a movable bridging member co-operating with the stationary electrode to close an electric circuit between it and one member of the pair of electrodes positioned on one side of the parts to be welded, said movable electrode adapted to be brought into contact with the opposite side of the parts to be welded to complete a circuit through them with the other member of the pair of electrodes.

4. In an apparatus of the class described, the combination of a frame to support the members to be welded in assembled relation, a movable member carried by said frame, a pair of electrodes carried by said movable member and connected to a source of welding current, said movable member being movable to assume either of two positions, in one of which one of the electrodes is positioned in contact with one side or surface of the members to be welded and, in the other of which, the other electrode is positioned in contact with the other side or surface of the members to be welded, and means for completing an electric circuit through said members to be welded with one or the other of said electrodes.

5. In an apparatus of the class described, the combination of a frame to support the members to be welded in assembled relation, a movable member carried by said frame, a pair of electrodes carried by said movable member and connected to a source of welding current, said movable member being movable to assume either of two positions, in one of which one of the electrodes is positioned in contact with one side or surface of the members to be welded and, in the other of which, the other electrode is positioned in contact with the other side or surface of said members, a fulcrum electrode, a bridging member cooperating therewith to complete an electric circuit through said members with one of said first-mentioned electrodes, and a movable electrode adapted to complete an electric circuit through said members with the other of said first-mentioned electrodes.

6. In an apparatus of the class described, the combination of a frame to support the members to be welded in assembled relation, means for moving an electrode against either side or surface of said members, a fulcrum electrode, a freely movable connector lever cooperating with said fulcrum electrode to complete a circuit with an electrode bearing on one side of said members, and a movable electrode adapted to complete a circuit with an electrode bearing on the other side of said members.

7. In an apparatus of the class described, the combination of a frame to support the members to be welded in assembled relation, means for bringing an electrode to bear at will against either one or the other side or surface of said members, and means for completing a circuit with such electrode through said members.

8. In an apparatus of the class described, the combination of a frame to support the members to be welded in assembled relation, a swinging member, an electrode carried thereby, said member being swingable to bring said electrode to bear against the lower surface of the members to be welded, and a movable electrode adapted to complete a circuit with said first-mentioned electrode through said members.

9. In an apparatus of the class described, the combination of means for receiving and supporting the members to be welded together in assembled relation, a pivotally mounted swinging member, a pair of electrodes carried thereby, one on each side of the pivot of said member, whereby said member may be swung to cause said electrodes to contact with the members to be welded together, on respectively opposite sides or surfaces thereof, and means for completing an electric circuit with that one of said electrodes in contact with said members to weld the same together.

10. In an apparatus of the class described, the combination of means for receiving and supporting the members to be welded together in assembled relation, a pivotally mounted swinging member, a pair of electrodes carried thereby, one on each side of the pivot of said member, whereby said swinging member may be moved to cause said electrodes to contact with the members to be welded together on respectively opposite sides or surfaces thereof, means for clamping said swinging member in position with one or the other of said electrodes in contact with the members to be welded together, and means for completing an electric circuit through said members with that one of said electrodes in contact with said members to weld the same together.

11. In a machine for welding together sheet metal stampings to form an automobile body, an assembly frame to receive and retain the stampings to be welded, a swinging member pivotally mounted intermediate its ends upon the frame, conductor bars carried by said member on opposite sides of its pivot, whereby said conductor bars may be brought respectively into welding position with reference to opposite sides or surfaces of the stampings, and means for completing an electric circuit with said conductor bar through said stampings to weld the same together.

12. In a machine for welding together sheet metal stampings to form an automobile body, an assembly frame to receive and retain the stampings to be welded, movable electrodes, a swinging member pivotally mounted intermediate its ends upon the frame, and conductor bars carried by said member on opposite sides of its pivot whereby said conductor bars may be brought respectively into cooperative welding position with reference to opposite sides or surfaces of the stampings, said movable electrodes and conductor bars being included in an electric welding circuit.

13. In a machine for welding together sheet metal stampings to form an automobile body, an assembly frame to receive and retain the stampings to be welded, movable electrodes, a swinging member pivotally mounted intermediate its ends upon the frame, and conductor bars carried by said member on opposite sides of its pivot whereby said conductor bars may be brought respectively into cooperative welding position with reference to opposite sides or surfaces of the stampings and means to clamp said rocking member in either of its working positions, said movable electrodes and conductor bars being included in an electric welding circuit.

14. In a machine for welding together sheet metal stampings to form an automobile body, an assembly frame including vertically disposed side standards pivotally mounted to swing towards and from each other to clamp and release the work, and means to weld the parts while so clamped.

15. In a machine for welding together sheet metal stampings to form an automobile body, an assembly frame including standards pivotally mounted at opposite sides of the frame to rock towards and from each other to clamp and release the work when disposed between them, clamp devices carried by the upper ends of the standards to engage and hold the work, and means to electrically weld the parts while so held and clamped.

16. In a machine for welding together sheet metal stampings to form an automobile body, an assembly frame including standards pivotally mounted at opposite sides of the frame to rock towards and from each other to clamp and release the work when disposed between them, means to retain said standards in their clamping position upon the work, and means to electrically weld the parts while so clamped.

17. In a machine for welding together sheet metal stampings to form an automobile body, an assembly frame including standards pivotally mounted at opposite sides of the frame to rock towards and from each other to clamp and release the work when disposed between them, straps connected to the assembly frame and embracing the standards, said straps carrying means to engage said standards, and hold them in clamping position, and means to electrically weld the parts while so clamped.

18. In a machine for welding together sheet metal stampings to form an automobile body, an assembly frame including vertically disposed side standards pivotally mounted to swing towards and from each other to clamp and release the work, gauge devices carried by said standards to facilitate the assembly of the stampings therebetween, and means to electrically weld the stampings while so clamped.

19. In an assembling and welding apparatus, a framework to receive and retain the parts to be welded together, and including a transversely extending end frame, said end frame having gauge stops, conductor leads carried by the framework and against which the parts to be welded bear when assembled in position, and a cooperating welding electrode.

20. In the manufacture of sheet metal automobile bodies, a jig or frame in which sheet metal stampings to form the body are assembled in proper position and relation, conductor bars located at various points in said frame, said frame including vertically extending side portions, a conductor bar carried by each of said side portions and located outside the stampings to be joined, said conductor bar forming part of an electric circuit, a cooperating conductor bar also included in said circuit and adapted to contact with the parts to be welded, and a movable bridging member cooperating with said conductor bars at various points where welds are to be formed.

21. In the manufacture of sheet metal automobile bodies, a jig or frame in which sheet metal stampings to form the body are assembled in proper position and relation, conductor bars located at various points in said frame, said frame including vertically extending side portions, a conductor bar carried by each of said side portions and located below and outside the stampings to be welded, a conductor bar positioned above and in contact with the parts to be joined, and a bridging member cooperating with said conductor bars at various points where welds are to be made.

22. In a machine for welding together sheet metal stampings to form an automobile body, a jig or frame in which the stampings are assembled, a rock member pivotally mounted on said frame and carrying a conductor bar to be brought into contact with the parts to be welded, a clamp member mounted to rock into position to releasably secure said rock member in position for said bar to contact with the stamping parts to be welded, and a movable electrode cooperating with said bar to weld the parts together at various points along the length of said bar.

23. In a machine for welding together sheet metal stampings to form an automobile body, an assembly frame including vertically extending side standards, a face plate carried by each standard and extending inwardly beyond the edge of the standard to form an abutment to position and hold vertical portions of the stampings in place, and means to weld the stampings while held in position.

24. In a machine for welding together sheet metal stampings to form an automobile body, an assembly frame including vertically extending side standards, a face plate adjustably mounted on the side and extending inwardly beyond the edge of each standard to form abutments to position and hold in place vertical portions of the stampings, and means to weld the stampings together while held in position.

25. In an apparatus of the class described, the combination of a framework to receive and support the members to be welded together, an electrode adjacent the joint between said members but out of contact therewith, a second electrode disposed above and in contact with one of said members adjacent said joint, and a connector adapted to complete a circuit from one electrode through said members to the other at any point along the joints between the members to thereby weld the members together.

26. In an apparatus of the class described, the combination of a framework to receive and retain members to be welded together, an electrode disposed above the parts to be welded together and in contact with said members, and a connector lever adapted to fulcrum on said fulcrum electrode and to exert a pressure upwardly upon said members and against the first named electrode, to complete a circuit between said electrodes through said members to weld the same together.

27. In an apparatus of the class described, the combination of a framework to receive and retain members to be welded together, a fulcrum electrode disposed out of contact with said members, a movable electrode adapted to be disposed above the surfaces to be welded together and in contact with one of them, and a connector lever adapted to fulcrum on said fulcrum electrode and to exert a pressure on said members against the movable electrode, to complete an electric circuit between said electrodes through said members to weld the same together.

28. In an apparatus of the class described, the combination of a framework to receive and retain members to be welded together, a fulcrum electrode disposed out of contact with said members, a rock member pivotally mounted on said framework, an electrode carried by said rock member and adapted to be disposed above the members to be welded together and in contact with one of them, and a connector lever adapted to fulcrum on said fulcrum electrode and to exert a pressure on the other side of said members and against said rock member electrode, to complete an electric circuit between said electrodes through said members to weld the same together.

29. In an apparatus of the class described, the combination of a framework to receive and retain the members to be welded together, a fulcrum electrode disposed out of contact with said members, a rock member pivotally mounted on the framework, an electrode carried by said rock member, means for clamping said rock member in position with said electrode disposed above the members to be welded together and in contact with one of them, and a connector lever adapted to fulcrum on said fulcrum electrode and to exert a pressure on the other side of said members and against said rock member electrode, to complete an electric circuit between said electrodes through said members to weld the same together.

30. In an apparatus of the class described, the combination of means for receiving and supporting members to be welded together in assembled relation, a movable electrode adapted to contact one side of the joint between said members, a relatively stationary electrode adjacent said joint but spaced therefrom, and means for completing a circuit between said electrodes and through said members at any point along the joint between the same.

31. In an apparatus of the class described, the combination of means for receiving and supporting in assembled relation sheet metal stampings to be welded together to form an automobile body, a swinging electrode adapted to contact with portions of the stampings to be welded along the joint between them, a stationary electrode adjacent said joint but spaced therefrom, and means for completing a circuit between said electrodes and through said portions of the stampings to weld the same together.

32. In a machine for welding together sheet metal stampings to form an automobile body, an assembly frame including vertically extending side standards, and horizontally disposed side members, to receive, support and position the stamping to be welded, conductor bars carried by said horizontal side members and with which the portions of the stampings to be welded contact, and a cooperating movable electrode, said conductor bars and electrode being included in an electric welding circuit.

33. In a machine for welding together sheet metal stampings to form an automobile body, an assembly frame including vertically extending side standards, and horizontally disposed side members, to receive support and position the stampings to be welded, conductor bars carried by said horizontal side members, means to clamp the parts to be welded upon said conductor bars, and cooperating movable electrode, said conductor bars and electrode being included in an electric welding circuit.

34. In a machine for welding together sheet metal stampings to form an automobile body, an assembly frame including vertically extending side standards, and horizontally disposed side members, to receive support and position the stampings to be welded, conductor bars carried by said horizontal side members, a bracket carried by the horizontally disposed frame member, a clamp arm pivoted to the bracket and adapted to engage the parts to be welded and clamp the same upon the conductor bars, a releasable strap to engage said arm to hold the same in clamping relation, and means cooperating with said conductor bars to effect the welding of the parts to be welded.

35. In a machine for welding together sheet metal stampings to form an automobile body, an assembly frame including vertically disposed side standards to receive and position the stampings to be welded, a clamp bar carried by the upper end of each standard, each clamp bar having a bent-over end to overreach, engage and clamp the upper edge of the stamping to hold the same in assembled relation, and means to electrically weld the assembled and clamped stampings.

36. In a machine for welding together sheet metal stampings to form an automobile body, an assembly frame including vertically disposed side standards to receive and position the stampings to be welded, a vertically disposed horizontally swinging gate hinged to each standard, a clamp rod pivoted to said standard and having means to engage said gate and detachably clamp the same in working position, a conductor bar carried by said gate, and a cooperating electrode, said conductor bar and electrode being included in an electric welding circuit.

In testimony whereof, I affix my signature.

JOSEPH LEDWINKA.